Feb. 14, 1967   G. BAECHLI   3,303,925
BELT TENSIONING APPARATUS
Filed Nov. 16, 1965   2 Sheets-Sheet 1
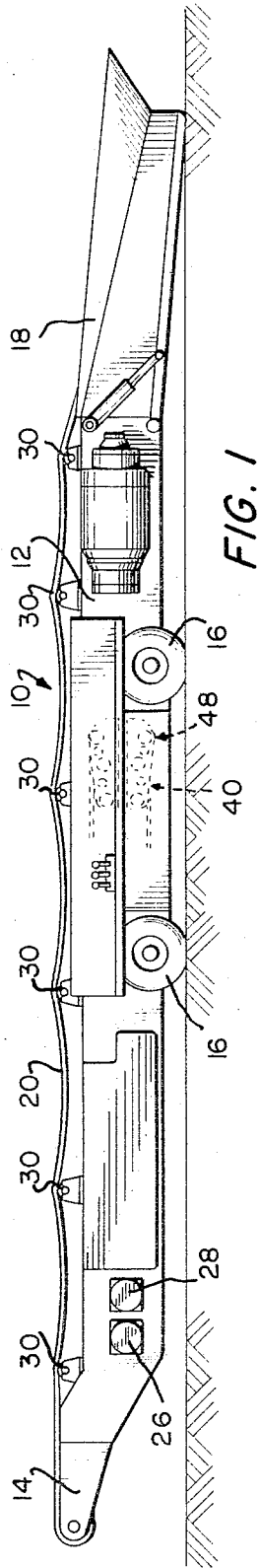
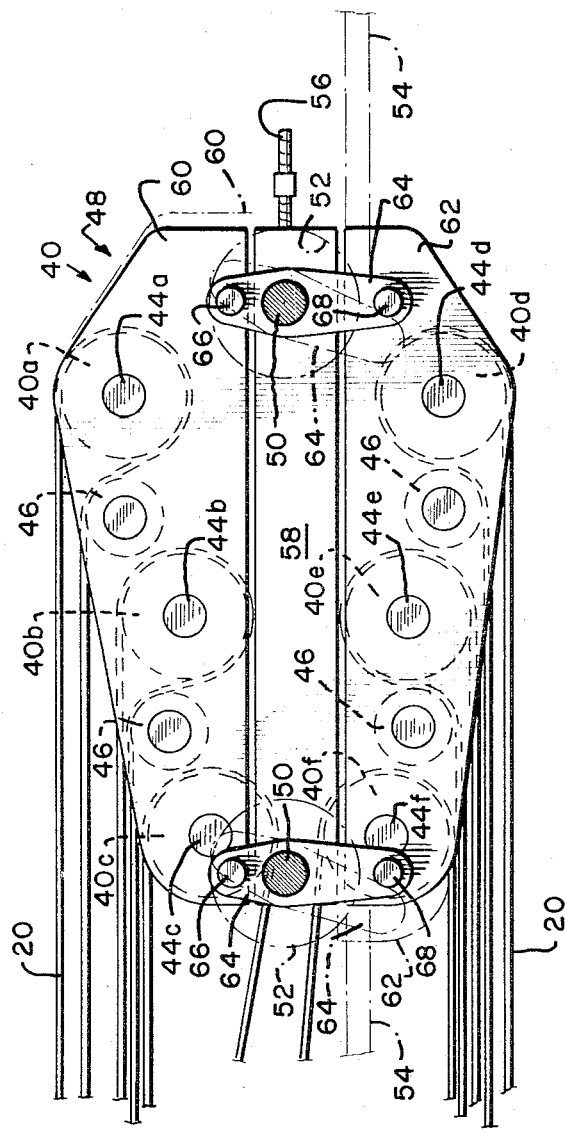
INVENTOR.
GEORGE BAECHLI

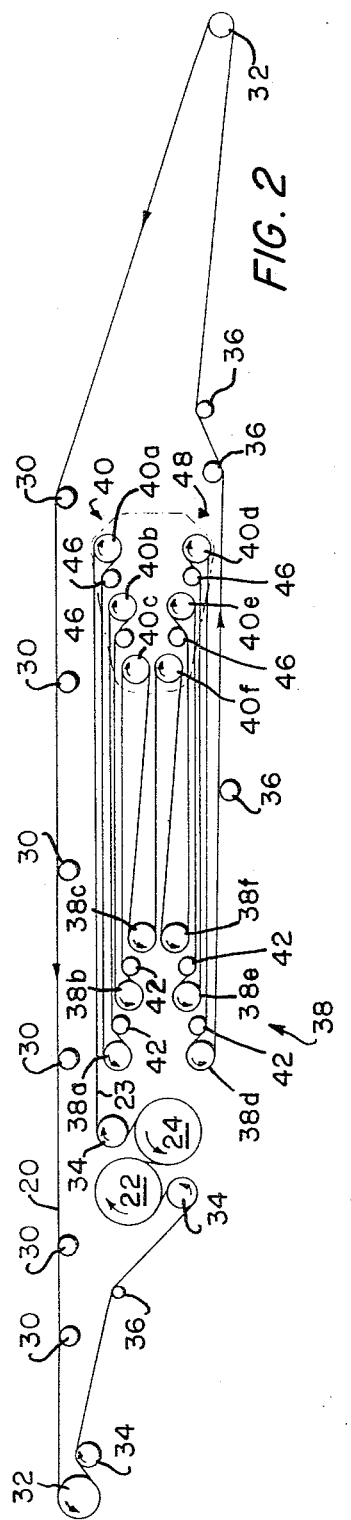
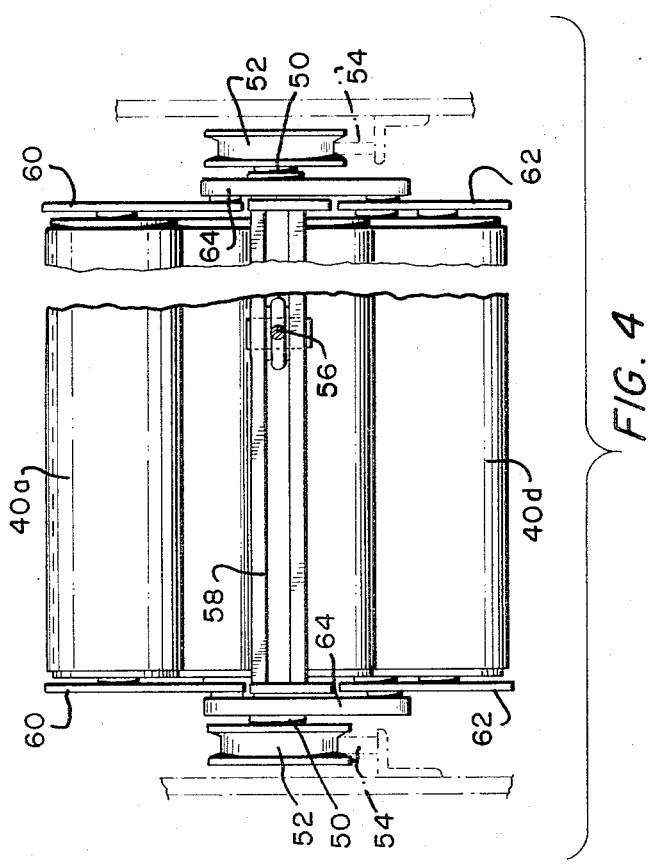
INVENTOR.
GEORGE BAECHLI

United States Patent Office 3,303,925
Patented Feb. 14, 1967

3,303,925
BELT TENSIONING APPARATUS
George Baechli, New Philadelphia, Ohio, assignor to Lee-Norse Company, Charleroi, Pa., a corporation of Delaware
Filed Nov. 16, 1965, Ser. No. 508,040
10 Claims. (Cl. 198—208)

This application is a continuation-in-part of my application Serial No. 411,907, which was filed November 17, 1964.

The present invention relates to belt tensioning apparatus and has more particular reference to the provision of a new and improved apparatus for controlling the tensions in the runs of a longitudinally movable belt such as, for example, a conveyor belt of an extendible conveyor.

The initial longitudinal movement of the conveyor belt of an extendible conveyor starting from rest normally results in a slackening of the belt runs on the forward or push side of the belt driving rollers. This slackening of the belt must be eliminated immediately upon its occurrence, otherwise the belt will slip on the belt driving rollers. Conventionally, numerous attempts have been made to eliminate this slackening of the belt through the introduction of an extremely high tension into the belt. Generally, however, these attempts have been unsuccessful in that they required the introduction into the belt of a tension in excess of the maximum permissible per unit of belt width.

An object of the present invention is to provide a new and improved apparatus which is substantially immediately responsive to the slackening of a run of a longitudinally movable belt, such as a conveyor belt of an extendible conveyor, to automatically increase the tension in the belt run to eliminate the slackening thereof.

Another object of the invention is to provide a new and improved apparatus of this type which is relatively simple and economical in construction and highly efficient and dependable in operation.

These objects and those other objects and advantages of the invention which will be apparent from the following description taken in connection with the accompanying drawings are obtained by the provision, with a longitudinally movable belt having a plurality of non-aligned runs and drive means operatively connected to the belt for longitudinally driving such, of a first supporting means supporting one of the runs of the belt, a second supporting means supporting a second of the runs of the belt, and lever means connecting the first and second supporting means to make such move to increase the tensions in the run under the lower tension in response to a tension differential between the runs.

Referring to the drawings wherein an embodiment of the invention has been shown as applied to an extendible conveyor for the purposes of illustration:

FIG. 1 is an elevational side view of the extendible conveyor with the embodiment of the invention thereon shown in dotted lines;

FIG. 2 is a schematic diagram of the conveyor belt of the extendible conveyor which is shown in FIG. 1;

FIG. 3 is an enlarged, elevational side view of the apparatus provided by the present invention which is on the extendible conveyor illustrated in FIG. 1; and FIG. 4 is a partially broken, elevational end view of the apparatus illustrated in FIG. 3.

Referring more particularly to the drawings wherein similar reference characters designate corresponding parts throughout the several views, FIG. 1 illustrates an extendible conveyor designated generally at 10 which is of the type disclosed in my application Serial No. 411,907, which was filed November 17, 1964. The extendible conveyor 10 comprises a supporting frame having a head section 12 and a tail section 14 which is detachably secured to the tail end of the head section 12. The head section 12 pivotally carries a loading hopper 18 at its head end and is supported and longitudinally movable by a plurality of wheels 16.

An endless conveyor belt 20 longitudinally connects the head section 12 with the tail section 14 and extends into the loading hopper 18. The conveyor belt 20 is longitudinally movable as indicated by the arrows in FIG. 2 to convey disintegrated material deposited in the loading hopper 18 to the tail section 14. The conveyor belt 20 is longitudinally driven by a first rotatable driving roller 22 and a second rotatable driving roller 24 which are carried by the head section 12 and actuated, respectively, by a fluid motor 26 and a fluid motor 28. The conveyor belt 20 is aligned and guided throughout its longitudinal movement by a plurality of troughing idlers 30 carried by the upper surface of the head section 12, an end idler 32 carried by each of the tail section 14 and the loading hopper 18, a snubber 34 carried by the tail section 14, and a plurality of snubbers 34 and return rollers 36 carried by the head section 12.

The conveyor belt 20 is automatically adjusted in effective length during the extension and retraction of the conveyor 10 by a belt storage apparatus carried by the head section 12. The belt storage apparatus stores a plurality of nonaligned runs of the conveyor belt 20 and adjusts the effective length thereof by feeding out the stored runs during the extension of the conveyor 10 and increasing the lengths of the stored runs during the retraction of the conveyor 10. The belt storage apparatus comprises a stationary roller bank 38 and a movable roller bank 40 which are located on the head section 12 on the forward or push side 23 of the driving rollers 22 and 24.

The stationary roller bank 38 comprises a plurality of clusters of rotatable rollers which are carried by the head section 12 for rotation about stationary axes. More specifically, the stationary roller bank 38 comprises a first cluster of rotatable rollers 38a, 38b, and 38c and a second cluster of rotatable rollers 38d, 38e, and 38f which are located in vertical alignment with the rotatable rollers 38a, 38b, and 38c, respectively. A snubber 42 is disposed intermediate the adjacent ones of the rotatable rollers forming each of the clusters to prevent interference between the belt runs carried by the rotatable rollers.

The movable roller bank 40 comprises a plurality of clusters of rotatable rollers which are adapted for conjoined movement relative to the stationary roller bank 38. More specifically, the movable roller bank 40 comprises a first cluster of rotatable rollers 40a, 40b, and 40c and a second cluster of rotatable rollers 40d, 40e, and 40f which are disposed in vertical alignment with the rotatable rollers 40a, 40b, and 40c, respectively. The rotatable rollers 40a, 40b, and 40c are disposed upon the rotatably mounted shafts 44a, 44b, and 44c, respectively, and receive the stored belt runs disposed immediately adjacent the push side 23 of the driving rollers 22 and 24. The rotatable rollers 40d, 40e, and 40f are disposed upon the rotatably mounted shafts 44d, 44e, and 44f, respectively, and receive the stored belt runs disposed remote from the push side 23 of the driving rollers 22 and 24. A snubber 46 is disposed intermediate the adjacent ones of the rotatable rollers forming each of the clusters to prevent interference between the belt runs carried by the rotatable rollers.

The shafts supporting the rotatable rollers forming the movable roller bank 40 are carried by a carriage designated generally at 48. The carriage 48 is supported by a plurality of shafts 50 which carry carriage wheels 52 movable upon wheel tracks 54 formed longitudinally along each side of the head section 12. The conveyor belt 20, subsequent to its passage around the driving rollers 22 and 24, extends around the rotatable roller 40a of the movable roller bank 40, the rotatable roller 38a of the stationary roller bank 38, and then passes alternatively around the other rotatable rollers of the movable roller bank 40 and the stationary roller bank 38. Thus, the conveyor belt 20 draws the carriage 48 towards the stationary roller bank 38 to increase the effective length of the conveyor belt 20 as the conveyor 10 extends. The carriage 48 is connected by a jack rope 56 to a single-acting hydraulic jack (not shown) which serves to pull the carriage 48 from the stationary rollers 38 to decrease the effective length of the conveyor belt 20 during the retraction of the conveyor 10.

The carriage 48, as shown in FIGS. 3 and 4, is formed to include an intermediate member 58 and a plurality of upper and lower supporting members 60 and 62, respectively, which are disposed upon opposing sides of the intermediate member 58. The intermediate member 58 supports the shafts 50 which carry the carriage wheels 52 and is connected to the jack rope 56. The upper supporting members 60 cooperate to support the opposing ends of the shafts 44a, 44b and 44c which carry the rotatable rollers 40a, 40b, and 40c, respectively, and are thus subjected to the tension in the belt runs carried by these rollers. The lower supporting members 62 cooperate to support the opposing ends of the shafts 44d, 44e, and 44f which carry the rotatable rollers 40d, 40e, and 40f, respectively, and are thus subjected to the tension in the belt runs carried by these rollers. The rotatable rollers 40a, 40b, and 40c, as was previously described, carry the belt runs disposed immediately adjacent the push side 23 of the driving rollers 22 and 24. The rotatable rollers 40d, 40e, and 40f, as was previously described, carry the belt runs disposed remote from the push side 23 of the driving rollers 22 and 24. Thus, the before disclosed construction of the carriage 48 subjects the upper supporting members 60 to the tension in the conveyor belt 20 immediately upon the push side 23 of the driving rollers 22 and 24, and subjects the lower supporting members 62 to the tension in the conveyor belt 20 remote from the push side 23 of the driving rollers 22 and 24.

A rigid lever arm 64 is pivotally connected intermediate its ends to each of the shafts 50 on each side of the carriage 48. The lever arms 64 are fixedly connected adjacent one of their ends to an upper supporting member 60 by a pin 66 and adjacent the other of their ends to a lower supporting member 62 by a pin 68. The lever arms 64 support the upper supporting members 60 and the lower supporting members 62 in spaced relationship to the intermediate member 58 and provide conjoined opposing movement of the upper and lower supporting members 60 and 62, respectively, upon their pivotal movement.

In the illustrated embodiment of the invention, the lever arms 64 are each proportioned such that their length between the pin 68 and the shaft 50 is substantially twice their length between the pin 66 and the shaft 50. This construction has been found to be usually preferable in the illustrated application of the invention as it provides the upper supporting members 60 with substantially twice the pull as the lower supporting members. Alternatively, however, the lever arms 64 may be of other differential proportions and may even, in some instances, be of equal length on both sides of the shafts 50.

In the operation of the conveyor 10, the initial longitudinal movement of the conveyor belt 20 starting from rest slackens the belt runs carried by the rotatable rollers 40a, 40b, and 40c. Simultaneously, however, the initial movement of the conveyor belt 20 tightens the belt runs carried by the rotatable rollers 40d, 40e, and 40f. Thus, the lower supporting members 62 are moved from their solid position of FIG. 3 to their dotted position therein, thereby pivoting the lever arms 64 to provide conjoined opposing movement of the upper supporting members 60 from their solid position of FIG. 3 to their dotted position therein. This latter movement, as will be seen, increases the tension in the belt runs carried by the rotatable rollers 40a, 40b, and 40c to eliminate the slackness therein and thereby prevents the conveyor belt 20 from slipping on the driving rollers 22 and 24.

After the conveyor belt 20 has been thus started from rest, the tensions therethroughout become substantially equalized. Thus, the apparatus which is provided by the present invention serves merely to support the movable roller bank 40 during the continuation of the operation of the conveyor 10. When, however, the conveyor belt 20 is stopped and then restarted from rest, this apparatus again acts in the before described manner to prevent the conveyor belt 20 from slipping on the driving rollers 22 and 24.

From the foregoing description it will be seen that, while the apparatus which I have provided is particularly suitable for employment in an extendible conveyor, it is readily and simply adaptable for employment in many other situations in which a longitudinally movable belt includes a plurality of nonaligned runs. It will also be seen that the apparatus which I have provided is substantially immediately responsive to a slackening in a belt run to tighten the belt run and is relatively simple and economical in construction while being highly efficient and dependable in operation.

From the foregoing, it will be seen that I have provided new and improved means for accomplishing all of the objects and advantages of my invention.

Having thus described my invention, I claim:

1. In combination with a longitudinally movable belt having a plurality of nonaligned runs and driving means operatively connected to said belt for longitudinally driving said belt:
   first supporting means supporting a first of said runs of said belt;
   second supporting means supporting a second of said runs of said belt; and
   lever means connecting said first and second supporting means to make said first and second supporting means move in response to a tension differential between said first and second runs to increase the tension in the one of said first and second runs under the lower tension.

2. An apparatus according to claim 1, wherein said one of said runs is disposed adjacent the forward side of said driving means, said second of said runs is located remote from the forward side of said driving means, and said lever means connects said first and second supporting means to make such move in opposing directions to increase the tension in said one of said runs upon the slackening thereof.

3. In combination with a longitudinally movable endless belt having a plurality of nonaligned runs and driving means operatively connected to said belt for longitudinally driving said belt:
   an intermediate member;
   lever means pivotally connected intermediate its ends to said intermediate member;
   first supporting means carried by said lever means for movement therewith adjacent one side of said intermediate member and supporting a first of said runs of said belt; and
   second supporting means carried by said lever means for movement therewith adjacent another side of said intermediate member and supporting a second of said runs of said belt.

4. An apparatus according to claim 3, wherein said lever means is proportioned such that its length between its connections to said intermediate member and said first supporting means is different than its length between its connections to said intermediate member and said second supporting means.

5. An apparatus according to claim 3, wherein said lever means carries said first and second supporting means upon opposing sides of said intermediate member, said one of said runs is located adjacent the forward side of said driving means, and said second of said runs is located remote from the forward side of said driving means.

6. An apparatus according to claim 5, wherein said lever means comprises at least one lever arm proportioned such that its length between its connections to said intermediate member and said second supporting means is greater than its length between its connections to said intermediate member and said first supporting means.

7. An apparatus according to claim 6, wherein the length of said lever arm between its connections to said intermediate member and said second supporting means is twice its length between its connections to said intermediate member and said first supporting means.

8. In combination with an extendible conveyor including a longitudinally movable endless belt having a plurality of non-aligned variable length runs and a driving means longitudinally driving said belt:
- an intermediate member;
- a plurality of lever arms pivotally connected to said intermediate member and having their opposite ends extending to opposing sides of said intermediate member;
- a first supporting means carried by the ends of said lever arms extending upon one side of said intermediate member for movement with said lever arms and supporting a run of said belt located adjacent the forward side of said driving means; and
- a second supporting means carried by the ends of said lever arms extending upon the opposing side of said intermediate member from said first supporting means for movement with said lever arms and supporting a run of said belt located remote from the forward side of said driving means.

9. An apparatus according to claim 8, wherein the length of each of said lever arms between its connections to said intermediate member and said second supporting means is greater than its length betwen its connection to said intermediate member and said first supporting means.

10. An apparatus according to claim 9, wherein the therein described lengths of said lever arms are of a ratio of two to one.

References Cited by the Examiner
UNITED STATES PATENTS 2,973,084   2/1961   Sinden ------------ 198—208

ANDRES H. NIELSEN, *Primary Examiner.*

R. E. AEGERTER, *Assistant Examiner.*